(No Model.)
J. P. LOWELL.
Mixing and Feeding Apparatus for Grinding Mills.
No. 229,722. Patented July 6, 1880.
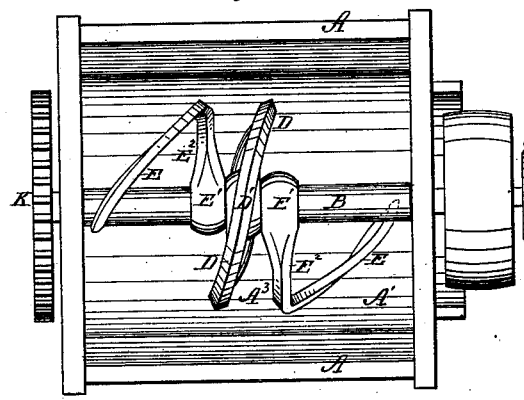
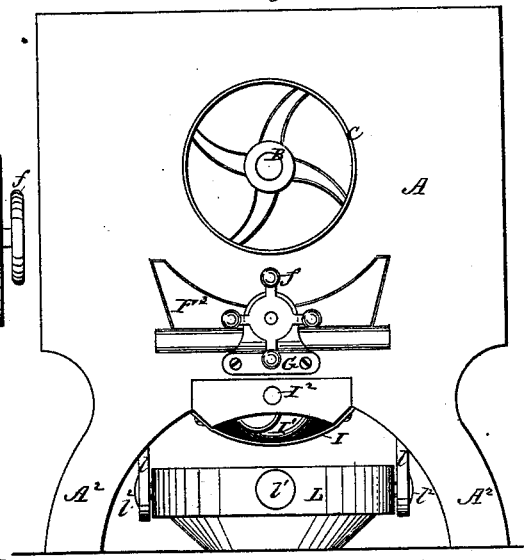
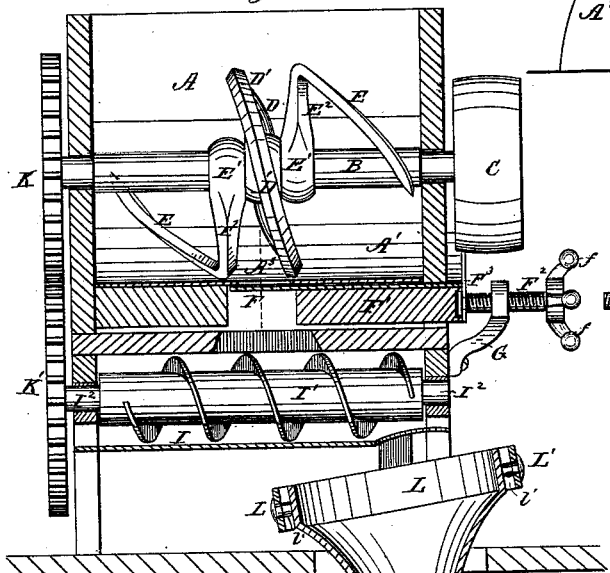
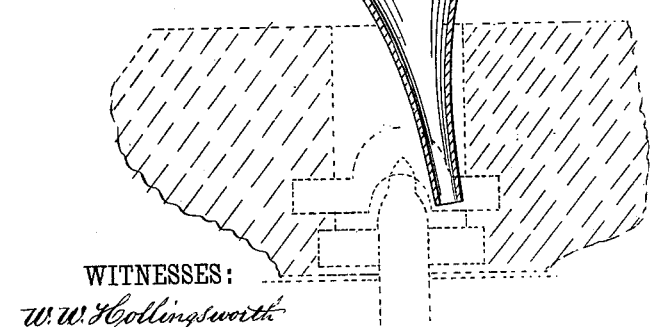
WITNESSES:
W. W. Hollingsworth
John C. Kenon
INVENTOR:
Jas. P. Lowell
BY
ATTORNEYS.

UNITED STATES PATENT OFFICE.

JAMES P. LOWELL, OF PURCELLVILLE, VIRGINIA.

MIXING AND FEEDING APPARATUS FOR GRINDING-MILLS.

SPECIFICATION forming part of Letters Patent No. 229,722, dated July 6, 1880.

Application filed March 24, 1880. (No model.)

*To all whom it may concern:*

Be it known that I, JAMES P. LOWELL, of Purcellville, in the county of Loudoun and State of Virginia, have invented a new and useful Improvement in Mill Feeding and Mixing Machines; and I do hereby declare that the following is a full, clear, and exact description of the same.

My invention relates to an improvement in mechanism for mixing and feeding material to the stones of a grinding-mill, whereby the action of the mixing and feeding devices is rendered uniform, one being started or arrested at the same time with the other and operated at the like rate of speed.

My invention consists in the peculiar construction and combination of parts, that may be fully understood by the following detailed description and the accompanying drawings, of which—

Figure 1 is a plan view of my invention; Fig. 2, a longitudinal section of the same; and Fig. 3, an end elevation of the machine. Fig. 4 is a sectional view of a modification of the device, showing a double valve in the bottom of the hopper.

The feed box or hopper A, for holding the material to be operated upon, is a rectangular box with sloping sides, vertical end walls, and a concave bottom, A', and is supported upon feet $A^2$, by which means it may be securely attached alongside of or to the framing of the co-operating machine. The main feeder and mixer shaft B is arranged longitudinally in the hopper, so that the concaved bottom of the hopper will be concentric with the axis of the shaft, and has secured to its end outside of the hopper a driving-pulley, C, that is connected by a belt with one of the revolving shafts belonging to or operating upon the machine to which the feeder forms an attachment. The shaft B extends from one end of the hopper to the other, and is journaled in the vertical end walls thereof, so as to turn freely. A feed-wheel, D, of peculiar construction, is secured upon the shaft B midway of its length, and is formed of a peripheral rim, D', secured to its hub by radial arms.

The rim D' has its outer surface V-shaped to form a dividing-edge, and is spirally twisted in one direction for one-half of its circumference and similarly twisted in the opposite direction for the other half or remaining portion of its circumference to form a compound or continuous right and left hand screw-thread.

The diameter of the feed-wheel D is such as to closely fit the concave bottom A' of the hopper, so that any material resting upon it is alternately moved from right to left and from left to right across its transverse central line.

A slotted opening, $A^3$, is formed in the concave bottom A' of the hopper, so that its central line will be coincident with the transverse central line of the feed-wheel. The shaft B also passes through and is keyed to the hubs E' E' of wiper-blades E E, arranged upon opposite sides of the feed-wheel D, each of which has radial shanks $E^2$ $E^2$, of such length as to bring the blades E E closely to the surface of the concave bottom A' of the hopper.

The blades E E are spirally twisted in opposite directions from right to left and from left to right of the feed-wheel D, and are arranged upon the shaft so that the heel of the wiper-blades will come nearly alongside of the edges of the slotted opening in the concave bottom A' of the hopper, and the point thereof will be near to the end walls of the hopper, so that the entire contents of the feed-hopper will be acted upon by the blades E and feed-wheel D to thoroughly mix the particles and conduct them to the discharge-opening at the lower central part of the hopper.

The slotted opening $A^3$ in the bottom of the hopper is covered, so that the amount of its opening is increased or diminished by a sliding valve-plate placed upon the under side of the metal plate forming the concaved bottom A' and shaped to conform thereto.

The valve-plate F is secured to a block, F', fitting snugly in guide-slots in the hopper-casing.

A set-screw, $F^2$, with a groove or pin at its end, is secured to the block F' by a plate, $F^3$, and the screw $F^2$ passes through and fits a corresponding thread in the metal bracket G, screwed to the casing A at the end of the hopper, so that as the screw $F^2$ is turned in one direction or the other the valve F will be moved across the opening $A^3$ to open or close it the required distance.

A handle, *f*, may be secured to the end of the screw F to aid in operation.

By the use of a single valve the control of the valve-opening in connection with the feed-wheel is only imperfectly obtained, as when the valve is but slightly opened.

One side only of the feed-wheel is operative to effectually draw a required amount of material across the opening. Under such conditions the valve-opening would be entirely upon one side of the transverse central line through the feed-wheel, and the spiral projection of the feed-wheel upon the corresponding side only of the feed-wheel would move across the opening. To fully overcome this objection the modification shown in Fig. 4 has been employed, in which two valves, H H', shaped like the valve F, are placed below the opening $A^3$, so that their meeting edges or joint formed by them when close together is exactly below the central line of the opening $A^3$ and the transverse central line of the feed-wheel.

The valves H H' are connected by a right and left hand screw, $H^2$, passing through tapped ears $h\ h$ on the ends of the valves. The screw $H^2$ passes out through the end of the casing and is provided with suitable handles $H^3$ for convenience in operating it.

A shield or cover may be secured to the bottom of one of the valves to prevent the material falling through the valve-opening from lodging upon the screw.

It will be readily seen from the above that the screw $H^2$ will operate upon both valves H H' at the same time, and both valves will be caused to move an equal distance to or from the central line of the opening at each turn, or partial turn, of the screw.

A conveyer-trough, I, formed of sheet metal, is screwed to the bottom of the feed-box, so that it will catch whatever may fall through the opening $A^3$, and is provided with a spiral blade or conveyer-screw, I', arranged in line with and directly below the feed-wheel shaft B, and journaled at its ends in the end walls of the hopper-casing.

Spur-wheels K K', of equal diameter, are keyed to the feed-wheel shafts D and conveyer-shaft $I^2$, and gear with each other, so as to operate at the same time and speed with each other.

The conveyer-trough I is provided with an opening or spout at its end for delivering the material that passes through it either to the eye of a pair of stones for grinding purposes or to the eye of a bolting-reel or mouth of any apparatus designed to be fed by it. When it is used for grinding a funnel-shaped pipe, L, is suspended from brackets $l\ l$ by ring L' and gimbal-joints $l'\ l'\ l^2\ l^2$, so that the lower end of the spout may be connected with the driver and carried around with it to direct the material to the joint between the millstones.

The operation of the mixer and feeder above described will be readily understood from the foregoing description.

It will be seen that the speed of the feeder is regulated entirely by the speed of the co-operating machine. The one moves at a corresponding feed with the other at all times, and when one ceases to operate the other will stop. When the conveyer and feed-wheel are stopped and the valve between them is open a limited quantity only of meal can pass from the feed-hopper, as the conveyer will stop the passage of the material through the trough. The mixing-blades will thoroughly agitate the material and draw it toward the discharge-opening of the hopper, and are an important feature of the device when employed for re-grinding middlings and other meal.

By means of the above-described mechanism only a given quantity of material will be fed to the consuming-machine at a time, to be regulated by the valve or valves in the bottom of the hopper, so that the mill or bolting machine will not be overfed and choked.

I do not claim in this instance the employment of the feeding devices, broadly, since they are shown in my prior patent for fertilizer-distributer.

I claim as my invention and desire to secure by Letters Patent—

In a mill feeding and mixing machine, the combination of the hopper A, the shaft B, and its attached diagonal feed-wheel, and the wiper-blades E, the screw-conveyer I', arranged beneath the hopper in trough I, and the meshing gearing K K', applied respectively to the ends of said shaft and conveyer, so that both rotate together with the desired invariable ratio of speed, as shown and described.

JAMES P. LOWELL.

Witnesses:
W. G. TRENARY,
A. L. TAYLOR.